C. G. CAPWELL.
DENTAL OBTUNDING SYRINGE.
APPLICATION FILED MAR. 19, 1917.
1,250,965.  Patented Dec. 25, 1917.
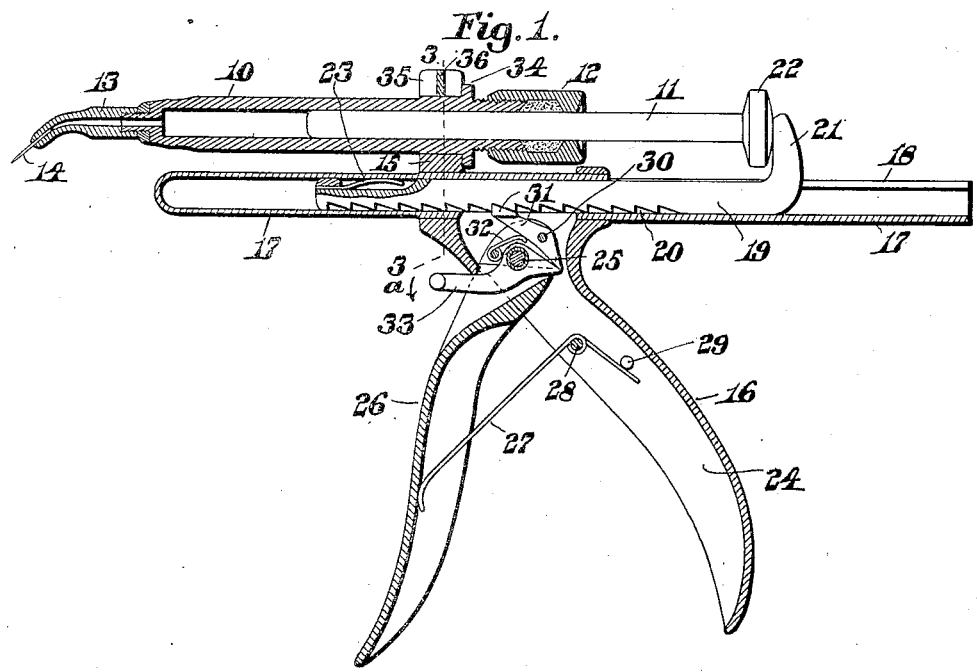
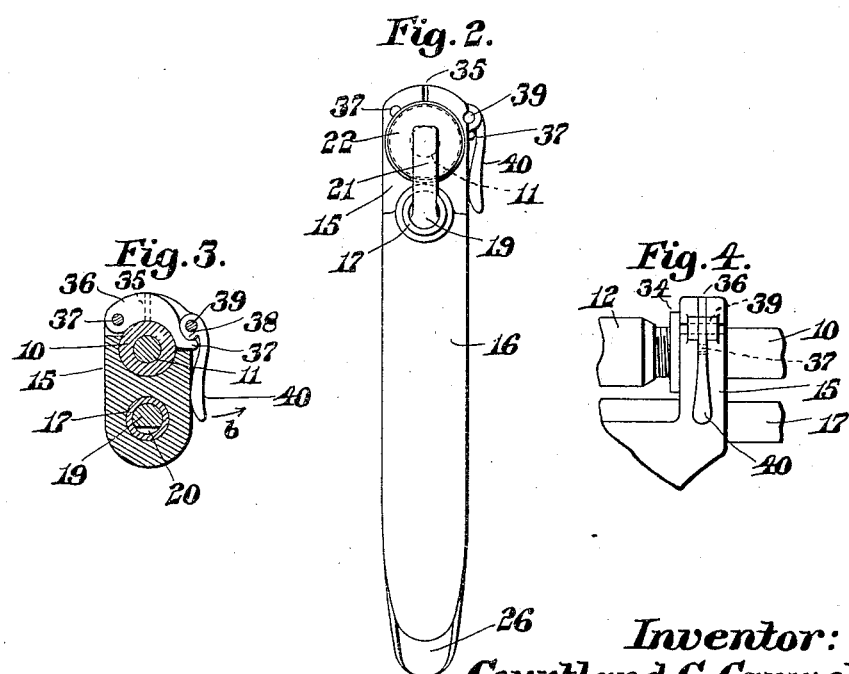
Inventor:
Courtland G. Capwell,
by Walter E. Lombard.
Atty.

UNITED STATES PATENT OFFICE.

COURTLAND G. CAPWELL, OF BOSTON, MASSACHUSETTS.

DENTAL OBTUNDING-SYRINGE.

1,250,965.  Specification of Letters Patent.  Patented Dec. 25, 1917.

Application filed March 19, 1917. Serial No. 155,899.

*To all whom it may concern:*

Be it known that I, COURTLAND G. CAPWELL, a citizen of the United States of America, and a resident of Boston, in the county of Suffolk and Commonwealth of Massachusetts, have invented certain new and useful Improvements in Dental Obtunding-Syringes, of which the following is a specification.

This invention relates to syringes, and particularly to devices of this character which are used by dentists and others for injecting an anesthetic in order to deaden the pain.

The object of the invention is to produce a device which may be operated quickly and effectively, and the invention consists primarily in providing the syringe proper with a hand grip comprising a fixed handle and a movable lever pivoted thereto and with mechanism interposed between the syringe plunger and said lever and actuated by the latter whereby a movement of the plunger will be given at each movement of the outer end of the lever toward the handle.

The invention further consists in certain novel features of construction and arrangement of parts which will be fully understood by reference to the description of the drawings and to the claims hereinafter given.

For the purpose of illustrating the invention, one preferred form thereof is illustrated in the drawings, this form having been found to give satisfactory and reliable results, although it is to be understood that the various instrumentalities of which the invention consists can be variously arranged and organized, and that the invention is not limited to the precise arrangement and organization of these instrumentalities as herein shown and described.

Of the drawings:

Figure 1 represents a section of a device embodying the principles of the present invention.

Fig. 2 represents a rear elevation of the same.

Fig. 3 represents a transverse section on line 3—3 on Fig. 1, and

Fig. 4 represents a side elevation of the mechanism for clamping the cylinder.

Similar characters designate like parts throughout the several figures of the drawings.

In the drawings, 10 is a cylinder having a plunger 11 extending therein through a stuffing box 12. The opposite end of the cylinder 10 has secured thereto a nozzle 13 provided with the usual needle 14. This cylinder 10 is mounted in a support 15 having a handle 16 extending downwardly therefrom.

The support 15 has also mounted therein a tubular member 17 the rear end of which is slotted as at 18. In this tubular member 17 is mounted a movable member 19 having a plurality of teeth 20 in the under side thereof. The movable member 19 is provided with an upwardly extending toe 21 adapted to engage the head 22 on the outer end of the plunger 11.

The toe 21 extending upwardly through the slot 18 prevents the member 19 from turning about its axis. The forward end of the member 19 is provided with a spring 23 which bears against the inner wall of the tubular member and creates sufficient friction thereon to retain said member in adjusted position in the tubular member 17.

The handle 16 is slotted as at 24, and has pivoted in said slot at 25 the lever 26, the lower end of which is normally moved away from the handle 16 by means of the spring 27 mounted upon the stud 28 with its opposite end bearing against a pin 29 in the slot 24, all as shown in Fig. 1 of the drawings. The upper end of the lever 26 has pivoted thereto at 30 a dog 31 the upper end of which is adapted to engage with the teeth 20 in the movable member 19. This dog 31 is normally held in engagement with the teeth 20 by means of the spring 32 carried by the pivoted lever 26. Whenever the lever 26 is moved toward the handle 16 the dog 31 being in engagement with the tooth 20 will move the member 19 quickly a predetermined distance and by means of the toe 21 bearing against the head 22 the plunger 11 will be moved into the cylinder 10 and force a desired amount of anesthetic through the nozzle 13 into the part of a person being treated.

When the member 19 has been moved in this manner to the closed end of the tubular member 17, the member 19 is returned to its normal position with the toe 21 near the extreme outer end of the slot 18, and the operation may then be repeated.

In order to move the member 19 to this outer position, or to withdraw it entirely from the tubular member for cleansing purposes, it is necessary to disengage the dog 31 from the teeth 20.

This is accomplished by means of the tripping lever 33 mounted upon the pivot 25 and bearing against the outer end of the dog 31. When the tripping lever 33 is moved downwardly in the direction of the arrow $a$ on Fig. 1, the dog 31 will be moved about its pivot 30 and disengaged from the teeth 20, the lever 26 at this time being moved about said pivot 25 toward the handle 16 to prevent the dog from again engaging the teeth 20 when the lever 33 is released.

When the member 19 has been removed from the tubular member 17 the plunger 22 may be removed from the cylinder 10 for the purpose of cleansing the same. The cylinder 10 is provided with a flange 34 which bears against the rear face of the support 15, thus preventing the movement of the cylinder 10 when the toe 21 is operated against the head 22 of the plunger 11 to move it endwise. The cylinder 10 may be rotated about its axis as desired in order to vary the position of the inclined end of the nozzle 13 relatively to the plane of the handle 16 and gripping lever 26.

This is of some advantage especially when the device is being used by dentists in order to better direct a needle into the cavities in the teeth or into parts of the gums which would otherwise be inaccessible. This adjustment of the cylinder 10 about its axis is accomplished when it has been unclamped from the bearings in the support 15. The upper part of the support 15 is split as indicated at 35 in Fig. 2 of the drawings, and is provided with a transverse vertical slot in which is mounted a clamping member 36 pivoted at 37 to the support 15.

This pivoted member 36 is curved to bear upon the upper part of the cylinder 10, and is provided with an outwardly extending toe 37 adapted to be engaged by the eccentric cam 38 pivoted at 39 to the opposite side of said support 15, and having a handle 40 by which it may be moved about said pivot 39.

When it is desired to release the cylinder 10 to permit its adjustment about its axis, the handle 40 is moved in the direction of the arrow $b$ on Fig. 3 of the drawings, thereby releasing the grip of the curved member 36 on the cylinder 10. When the parts 36 and 38—40 are in the position shown in Fig. 3 of the drawings, the cylinder 10 is held from rotation.

By means of the handle 16 and the pivoted lever 26 the device may be held firmly in the grip of the operator, and the long lever 26 in its operation gives sufficient leverage to cause a sudden movement of the plunger 11 and a quick discharge of the anesthetic from the cylinder 10 through the nozzle 13. The device is so constructed that all of the operating parts may be quickly dismantled for the purpose of sterilizing the same.

It is believed that the operation and many advantages of this invention will be fully understood from the foregoing description.

Having thus described my invention, I claim:

1. In a device of the class described, the combination of a cylinder; a nozzle on one end thereof; a plunger in said cylinder; a member movable therewith provided with a plurality of teeth; a handle for said cylinder; an oscillating lever pivoted thereto; means actuated by the movement of said lever for engaging said teeth and operating said plunger; and means for returning said lever to its normal position.

2. In a device of the class described, the combination of a cylinder; a nozzle on one end thereof; a plunger in said cylinder; a handle for said cylinder; a lever pivoted thereto; means actuated by the movement of said lever for operating said plunger; and a spring interposed between said handle and lever.

3. In a device of the class described, the combination of a cylinder; a nozzle on one end thereof; a plunger in said cylinder; a member movable therewith provided with a plurality of teeth; a handle for said cylinder; a lever pivoted thereto; and a spring pressed pawl pivoted to the inner end of said lever and engaging said teeth.

4. In a device of the class described, the combination of a cylinder; a nozzle on one end thereof; a plunger in said cylinder; a member movable therewith provided with a plurality of teeth; a handle for said cylinder; a lever pivoted thereto; a spring pressed pawl pivoted to the inner end of said lever and engaging said teeth; and means for disengaging said pawl from said teeth.

5. In a device of the class described, the combination of a cylinder; a nozzle on one end thereof; a plunger in said cylinder; a member movable therewith provided with a plurality of teeth; a handle for said cylinder; a lever pivoted thereto; a spring pressed pawl pivoted to the inner end of said lever and engaging said teeth; and a member movable about the pivot of said lever for disengaging the pawl from said teeth.

6. In a device of the class described, the combination of a cylinder; a nozzle on one end thereof; a plunger in said cylinder with one end projecting therefrom; a tubular guide having a slot therein; a member movable in said guide having a plurality of teeth and a toe projecting through said slot and engaging the outer end of said plunger but disconnected therefrom; a handle for said cylinder and tubular guide; and means on said handle for engaging the teeth of said member and actuating said plunger.

7. In a device of the class described, the combination of a cylinder; a nozzle on one end thereof; a plunger in said cylinder with one end projecting therefrom; a tubular guide having a slot therein and its rear end open; a member movable in said guide having a plurality of teeth and a toe projecting through said slot engaging the outer end of said plunger but disconnected therefrom; a handle for said cylinder and tubular guide; a lever pivoted to said handle; and a tooth engaging device carried by said lever.

8. In a device of the class described, the combination of a cylinder; a nozzle on one end thereof; a plunger in said cylinder with one end projecting therefrom; a tubular guide having a slot therein; a member movable in said guide having a plurality of ratchet teeth and a toe projecting through said slot and engaging the outer end of said plunger but disconnected therefrom; a handle for said cylinder and tubular guide; a lever pivoted to said handle; and a spring pressed tooth engaging pawl carried by said lever.

9. In a device of the class described, the combination of a cylinder; a nozzle on one end thereof; a plunger in said cylinder with one end projecting therefrom; a tubular guide having a slot therein; a member movable in said guide having a plurality of teeth and a toe projecting through said slot and engaging the outer end of said plunger; a handle for said cylinder and tubular guide; means on said handle for engaging the teeth of said member and actuating said plunger; and a member on said handle adapted to clamp said cylinder in adjusted position about its axis.

10. In a device of the class described, the combination of a cylinder; a nozzle on one end thereof; a plunger in said cylinder with one end projecting therefrom; a tubular guide having a slot therein; a member movable in said guide having a plurality of teeth and a toe projecting through said slot and engaging the outer end of said plunger; a handle for said cylinder and tubular guide; means on said handle for engaging the teeth of said member and actuating said plunger; a member pivoted to said handle and adapted to bear on said cylinder; and an eccentric clamping member coacting therewith.

11. In a device of the class described, the combination of a cylinder; a nozzle on one end thereof; a plunger in said cylinder with one end projecting therefrom; a tubular guide; a member movable in said guide having a plurality of teeth and a toe engaging the outer end of said plunger; a spring in a slot in said member in frictional contact with the inner wall of said guide; a handle for said cylinder and tubular guide; and means on said handle for engaging the teeth of said member and actuating said plunger.

12. In a device of the class described, the combination of a handled support; a tubular guide fixedly secured therein; a cylinder above said guide and adapted to be rotated about its axis; a nozzle on one end thereof; a plunger in said cylinder and projecting from the opposite end thereof; a reciprocating toothed member in said guide having a toe engaging the outer end of said plunger; means for preventing the rotation of said reciprocating member; a lever pivoted to said handle; and a tooth engaging member carried by said lever and adapted to move said reciprocating member at each movement of the outer end of said lever toward said handle.

Signed by me at 4 Post Office Sq., Boston, Mass., this 16th day of March, 1917.

COURTLAND G. CAPWELL.

Witnesses:
WALTER E. LOMBARD,
NATHAN C. LOMBARD.

Copies of this patent may be obtained for five cents each, by addressing the "Commissioner of Patents Washington, D. C."